United States Patent Office 2,746,923
Patented May 22, 1956

2,746,923
ADDITIVES FOR PETROLEUM PRODUCTS

Philip B. Gerhardt, Elizabeth, John O. Smith, Jr., North Plainfield, and Allen R. Jones, Fanwood, N. J., assignors to Esso Research and Engineering Company, a corporation of Delaware No Drawing. Application August 31, 1953,
Serial No. 377,698

12 Claims. (Cl. 252—33)

This invention relates to additives for use in stabilizing and inhibiting organic materials which are susceptible to oxidation and/or polymerization on contact with air or oxygen, or that cause rusting and the like, and particularly for use in mineral oils and other petroleum hydrocarbon products.

This application is a continuation-in-part of application Serial No. 98,158, filed on June 9, 1949, now abandoned.

It is well known in the art to utilize various addition agents in organic compositions in order to prevent the oxidation of the latter, which results in the production of undesirable degradation products such as peroxides, acidic materials, sludge, varnish-like deposits, and the like. This is particularly the case with respect to hydrocarbon products, both saturated and unsaturated, which are utilized as diesel fuels, motor fuels, and lubricants, including instrument oils, turbine oils, motor oils, greases, emulsifiable oils, and the like. These products are often subject to severe operating conditions of temperature and pressure which tend to aggravate the oxidation reaction. Furthermore, oxidation of the product, either during storage or use, causes undesirable results with respect to the metal surfaces, such as the parts of an internal combustion engine in which the products are used. Corrosion and pitting of the metal surfaces occur as well as various other effects which hinder the efficient operation of the engine.

A new type of additive has been discovered which efficiently reduces the undesirable effects of the oxidation reaction and which is particularly effective in reducing corrosion and rusting of metal surfaces, as ashless detergents and in inhibiting the tendency of oil to produce an insoluble sludge. These additives are effective in other types of petroleum oil products such as fuel oils in which they reduce the tendency of the oil to darken and to produce sludge. They are also useful in inhibiting various other organic compositions such as fats, waxes, vegetable oils, fish oils, resins, etc.

In accordance with the present invention, it has been found that certain quaternary salts of aryl azines are effective additives for the above described uses. These additives have substantially the following general formula:

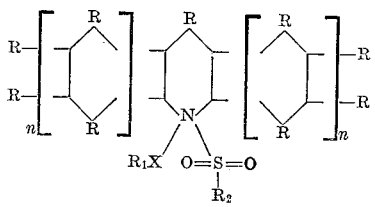

wherein the R radicals are selected from the class consisting of hydrogen and hydrocarbon groups having in the range of 1 to 20 carbon atoms, $n$ is 0 to 1, X is selected from the class consisting of oxygen and sulfur, $R_1$ is selected from the class consisting of alkyl and aromatic groups having in the range of 1 to 20 carbon atoms, and $R_2$ is selected from the class consisting of aryl and alkaryl groups having in the range of 6 to about 30 carbons atoms, particularly 6 to 24 carbon atoms.

The nitrogen-containing compounds which are employed in preparing the compounds of the present invention may be more exactly defined as aza aromatic compounds of the formulas:

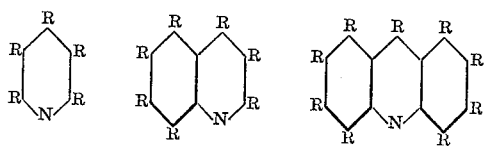

where the R groups represent hydrogen and hydrocarbon groups containing 1 to 20 carbon atoms. The hydrocarbon groups may, for example, be alkyl, alkenyl, cycloalkyl, aryl, or terpenic groups, or combinations of such groups. It is preferable, although not necessary, that the groups adjacent to the nitrogen atom in the ring, when such groups are alkyl groups, have at least one hydrogen atom attached to the carbon atom which is adjacent to the nucleus. Examples of these compounds are pyridine, picolines, lutidines, ethylpyridines, collidine, methylethylpyridines, conyrine, parvoline, 2-benzylpyridine, 3-phenylpyridine, quinoline, quinaldine, lepidine, dimethylquinolines, ethylquinolines, 2-phenylquinoline, tetracoline, acridine, 5-methylacridine, 5-phenylacridine, and the like.

These aza aromatic compounds may be converted to the desired compound by several procedures. For example, they may be reacted with an aryl sulfonyl halide, following which the halide radical is replaced with an —OR$_1$ or —SR$_1$ radical. In another procedure, an aza aromatic compound is reacted with a suitable ester of a sulfonic acid as described below.

Thus, in one procedure, aryl sulfonyl halides may be reacted with pyridine or similar compounds at room temperature and without the use of a catalyst, but temperatures in the range of about 0° to 100° F. may be employed. The reaction generally involves equimolar quantities of reactants. The use of equimolar quantities is preferred; however, other ratios may be used and unreacted material may be removed or left in the product as a diluent.

The aryl sulfonyl halides employed in forming the condensation product with the above nitrogen containing compounds have the general formula:

where R$_2$ is an aryl or alkaryl group having from 6 to 30 carbon atoms, such as benzene, naphthalene, anthracene and their alkyl derivatives, and T is a halogen such as chlorine, bromine and the like. Alkaryl groupings may have alkyl groupings having relatively few carbon atoms if the final product is used as an additive for motor fuels and the like, whereas side chains having from 8 to 20 carbon atoms may be used to increase oil solubility of the final product for use in lubricants and the like. Such compounds include benzene sulfonyl chloride, p-toluene sulfonyl chloride, 2-n-hexadecyl benzene sulfonyl chloride, naphthalene sulfonyl chloride, 4-isooctyl benzene sulfonyl chloride, petroleum sulfonyl chloride, etc.

The structure of the addition product formed by the reaction of the aryl sulfonyl halide with a nitrogen base of the type described has substantially the composition illustrated by the formula:

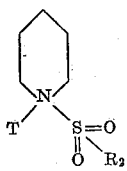

where T and $R_2$ have the meanings defined in connection with the above formula, $R_2$ SOOT.

Specific desirable compounds, for instance, are: benzene sulfonyl pyridinium chloride, benzene sulfonyl quinolinium chloride, benzene sulfonyl-2,6-lutidinium chloride, benzene sulfonyl quinaldinium chloride, benzene sulfonyl quinaldinium bromide, benzene sulfonyl lepidinium chloride, benzene sulfonyl-2-n-butyl pyridinium chloride, benzene sulfonyl-4-n-amyl pyridinium chloride, p-toluene sulfonyl-2,6-lutidinium chloride, 2-ethyl benzene sulfonyl-2-methyl pyridinium chloride, 2-ethyl benzene sulfonyl-4-methyl pyridinium chloride, p-toluene sulfonyl-quinaldinium chloride, naphthalene sulfonyl-2,6-lutidinium chloride, benzene sulfonyl-2 (5-nonyl) pyridinium chloride, benzene sulfonyl-2-lauryl-pyridinium chloride, benzene sulfonyl-4-octadecyl-pyridinium chloride, p-toluene sulfonyl 2-cetylpyridinium chloride, o-ethyl benzene sulfonyl-4-decyl pyridinium chloride, p-isopropyl benzene sulfonyl-2-hexadecyl quinolinium chloride, 4-(8-octadecyl) benzene sulfonyl pyridinium chloride, 4-n-tetra-decyl benzene sulfonyl-2,6-lutidinium chloride, 2-n-hexadecyl benzene sulfonyl-2-ethyl pyridinium chloride, naphthalene sulfonyl-4-hexadecylpyridinium chloride, 4-n-lauryl benzene sulfonyl-4-hexadecylpyridinium chloride and 4-isooctyl benzene sulfonyl-2-octadecyl pyridinium chloride.

The halogen, introduced by means of the aryl sulfonyl halide, is then replaced with a group containing a hydrocarbon radical, such as a group —XR' where X represents oxygen or sulfur and R' is a hydrocarbon group, which may be an alkyl, alkaryl or aralkyl group containing 1 to 20 carbon atoms. This is accomplished by treating the reaction product prepared according to the method described above with an alkali metal alcoholate, mercaptide, phenolate, or thiophenolate. This reaction is also generally carried out at room temperature, although the temperature may range from about 20° to about 100° C. or higher. The amount of the metal alcoholate, mercaptide or the like which is employed is normaly that which is theoretically equivalent to or slightly in excess of the halogen introduced into the first reaction product by means of the acid halide. It is possible to consider this product as having the typical constitution represented by the formula:

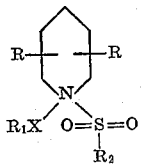

where R, $R_1$, $R_2$ and X have the meanings defined above.

The compounds of the type $R_1XM$ which may be employed in the modifying reaction are exemplified by the following: sodium methylate, sodium ethylate, potassium ethylate, sodium n-propylate, sodium isopropylate, sodium n-butylate, sodium tert.-butylate, sodium n-octylate, sodium cyclohexylate, sodium laurylate, sodium hexadecylate, sodium eicosylate, sodium ethyl mercaptide, sodium lauryl mercaptide, sodium phenylate, potassium phenylate, sodium naphthylate, the sodium salt of 1-hydroxy-4-phenyl-butane, the sodium salt of 1-hydroxy-3-phenylhexane, sodium thiophenylate, and the like. The metallic compounds may be derived from commercial mixtures of alcohols as well as from pure alcohols. An example of a suitable mixture is "Lorol B" alcohol, a mixture of $C_{10}$ to $C_{18}$ primary alcohols derived from coconut oil.

In an alternative procedure, an aromatic sulfonic acid is reacted with an esterifying compound, $R_1XH$, such as an alcohol, mercaptan, phenol or thiophenol, to form an ester. This may be carried out by conventional esterifying reactions, for example, by refluxing the sulfonic acid and the esterifying compound together and removing water formed during the reaction. The resulting ester and an aza aromatic compound of the type described above are then reacted together, preferably at temperatures such as about 20° C. to 100° C. to form the reaction product. This last reaction may be conducted in the presence of a solvent, such as an excess of the esterifying agent originally used, at refluxing temperature, for a suitable time such as about 1 to 10 hours. As a general rule, a slight excess of the aza aromatic compound, over that theoretically required for reaction with the ester, will be used. The reaction may be considered to proceed as follows:

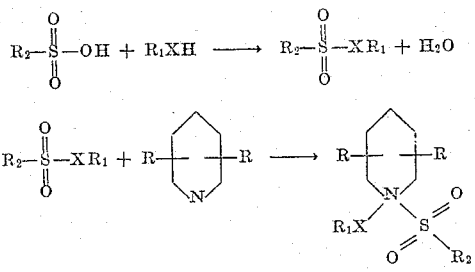

wherein R, $R_1$, $R_2$ and X have the meanings defined above.

The aromatic sulfonic acids useful in this reaction include those from which the above-listed halides were prepared. These include benzene sulfonic acid, toluene sulfonic acids, naphthalene sulfonic acids, petroleum sulfonic acids such as those having molecular weights in the range of about 200–500, etc. The esterifying compound, $R_1XH$, may correspond to any of the alcohols, mercaptans, phenols and thiophenols from which the above-listed $R_1XM$ compounds are obtained.

The quantity of the additive of the present invention which may be most advantageously blended in the material to be inhibited will depend upon the type of material and upon the conditions to which the material is to be subjected in use or in storage. Generally a total amount in the range of about 0.001 to 10% by weight or even higher will be used. Amounts in the range of about 0.001 to 1.0% will generally be sufficient to inhibit sludge formation, rusting and the like. Amounts in the range of about 0.05 to 2% by weight, based on the total composition, are useful for inhibiting oxidation and corrosion, particularly where the material being inhibited is a mineral lubricating oil.

In the following examples, various preparations and tests of additives prepared in accordance with the present invention will be described in detail, but it is to be understood that these examples are illustrative only and should not be considered as limiting the scope of the invention in any way.

EXAMPLE I

A sample of a solvent extracted turbine oil base having a Saybolt viscosity of 44 second at 210° F. and containing 0.06 per cent by weight of a zinc naphthenate corrosion inhibitor was tested for oxidation stability.

The test employed was a modification of the Staeger test and consists essentially of storing a 200 ml. sample of oil in a rotating shelf oven maintained at 110° C.±1°. A 40 x 70 mm. freshly polished copper strip is placed in the 400 ml. oil container to serve as an oxidation catalyst. This strip is removed every 72 hours and a clean strip is substituted. During the test, the shelf rotates at an angular velocity of 4–6 R. P. M. and positive ventilation of 1.5 to 2.0 cubic feet of air per hour is maintained.

Oil samples are periodically withdrawn from the container and the neutralization number is determined. The oxidation life of the sample is defined as the time in hours required to obtain an increase in neutralization number of 0.20 mg. KOH/g.

Under these test conditions, the oil was found to have an oxidation life of 65 hours.

EXAMPLE II

To the oil described in Example I, 0.2 weight per cent of 2,6-di-t-butyl-4-methylphenol was added. The oxidation life in the modified Staeger test described in Example I was 210 hours.

EXAMPLE III

After adding 0.4 weight per cent of 2,6-di-t-butyl-4-methylphenol to the oil described in Example 1, the oxidation life was increased to 475 hours.

EXAMPLE IV

Benzene sulfonyl quinolinium chloride was prepared by adding 17.7 grams of benzene sulfonyl chloride to 12.9 grams of quinoline. The product was crystallized from acetone, and the yield amounted to 24 grams. This material acted as an oxidation inhibitor and had a synergistic effect on the potency of 2,6-di-t-butyl-4-methylphenol as may be noted from Table I.

*Table I*

OXIDATION STABILITY OF TURBINE OIL SAMPLES

| Antioxidant | | | "Staeger" Oxidation Life, Hours a |
|---|---|---|---|
| Name | Concentration, Wt. Percent | Base Oil b | Base Oil + 0.2 Weight Percent 2,6-di-t-butyl-4-methyl-phenol c |
| None | 0.0 | 65 | |
| 2,6-di-t-butyl-4-methylphenol | 0.4 | 475 | 210 |
| Benzene sulfonyl quinolinium chloride | 0.4 | 115 | |
| Do | 0.2 | | 610 |
| Benzene sulfonyl (2,6-)lutidinium chloride | 0.4 | >768 (0.13) | |
| Do | 0.2 | | >950 |
| Benzene sulfonyl 8-hydroxy quinolinium chloride | 0.4 | 60 | |
| Do | 0.2 | | >570 (0.05) | a Numbers in parenthesis are increase in neutralization numbers at indicated time. Samples depleted at this point.
b Oil described in Example I.
c Oil described in Example II.

EXAMPLE V

Benzene sulfonyl lutidinium chloride was prepared by adding 31.1 grams of benzene sulfonyl chloride to 18.9 grams of lutidine. After cooling, grayish crystals formed. The crystals were recrystalized from acetone. The sample was blended in 0.4 weight per cent conc. in turbine oil described in Example I and the neutralization number increase was 0.13 after 768 hours. This poduct was also added in 0.2 weight per cent concentration to the turbine oil described in Example II which contained 0.2 weight per cent 2,6-di-t-butyl-4-methylphenol, and the Staeger life was 950 hours. In both cases, mentioned above, the exceptionally long life, during which portions of the sample had to be withdrawn for determination of neutralization number, resulted in depletion of the sample before it ever developed an increase of 0.2 neutralization number, which is the arbitrary measure of Staeger life as defined hereinbefore.

EXAMPLE VI

Benzene sulfonyl 8-hydroxy quinolinium chloride was prepared by adding 27.5 grams of benzene sulfonyl chloride to 22.5 grams of 8-hydroxy quinoline. Yellow crystals formed upon cooling. The crystals were recrystallized from a mixture of acetone and ethyl alcohol. The sample was blended in 0.4 weight per cent concentrate in turbine oil described in Example I, and the Staeger life was 60 hours. This product was also added in 0.2 weight per cent concentration to turbine oil described in Example II which was 0.2 weight per cent 2,6-di-t-butyl-4-methyl phenol, and the neutralization number increase was 0.05 after 570 hours at which sample became depleted.

EXAMPLE VII

A benzene sulfonyl lutidinium alkyl oxide was prepared from benzene sulfonyl lutidinium chloride, described in Example V. 0.8 grams of sodium were reacted with 15 grams of mixed $C_{10}$–$C_{18}$ alcohols which had an average chain length of $C_{12.6}$ and which were obtained from hydrogenated coconut oil. The mixture thus obtained was then added to benzene sulfonyl lutidinium chloride in the following proportions: 5.0 grams of benzene sulfonyl lutidinium chloride and 10.9 grams sodium derivative of the mixed alcohols. The reaction was carried out in xylene by refluxing for several hours, and then removing the xylenes by distillation. The product was a brownish red liquid. The sample was blended in 0.4 weight per cent concentrate in turbine oil, described in Example I, and the Staeger oxidation life was 739 hours. This product was also added in 0.2 weight per cent concentrate to turbine oil described in Example II which contained 0.2 weight per cent concentrate 2,6-di-t-butyl-4-methylphenol, and the Staeger life was 432 hours. No sludge was formed in either of the two Staeger tests, but the color of the sample that had a life of 739 hours was equally as good at the 667th hour as that of the other sample after 432 hours.

EXAMPLE VIII

Benzene sulfonyl lutidinium octadecyl sulfide was prepared by reacting benzene sulfonyl lutidinium chloride with the sodium salt of octadecylmercaptan as follows. Two grams of benzene sulfonyl chloride were reacted with 1.2 grams of lutidine by heating. Octadecyl mercaptan in the amount of 3.2 grams was reacted with 0.25 gram of sodium. The two reaction products above were combined and heated until reaction was complete using amyl acetate as a solvent. The sodium chloride was filtered off and the product crystallized from amyl acetate. The yield was 2.6 grams. The sample was blended in 0.4 weight per cent concentration in turbine oil described in Example I and the Staeger life determined to be greater than 1268 hours. The sample was blended in 0.2 weight per cent concentration in the above oil, containing 0.2 weight per cent 2,6-di-t-butyl-4-methylphenol; the Staeger life was greater than 1337.

Benzene sulfonyl lutidinium octadecyl sulfide is also a bearing corrosion inhibitor as measured by the S. O. D. 4 hour bearing corrosion test which is carried out as follows: 500 cc. oil sample is maintained at 325° F. and aerated with 2 cu. ft. per hour of air. A steel shaft to which is affixed two one-quarter copper-lead bearings with total bearing area of 4.5 sq. in., rotates at 600 R. P. M. with the bearings immersed in the oil. The test is run for four hours and the loss of weight of the bearings determined. The test is continued for another four hours, and the bearing weight loss again determined. The S. O. D. life is the number of hours at which the cumulative weight loss becomes 100 mg. Using an S. A. E. 20 oil, whose S. O. D. life was 9 hours, the S. O. D. life was 22 hours when the oil contained 0.25 weight per cent of the additive.

The above data may be more fully understood by a comparison of the oxidation test results which were described in Examples I to VI. For purposes of convenience, these results have been summarized in Table I. It may be seen from this table that under these accelerated oxidation conditions, in the case of both the benzene sulfonyl quinolinium chloride and the benzene sulfonyl 8-hydroxyquinolinium chloride, the compounds themselves had only a slight or no inhibitory effect. However, if these compounds are added to an oil containing an antioxidant known to be effective under these test conditions, a pronounced synergistic action is found. For example, by the proportional relationships that would be normally applied, a 50/50 mixture of 2,6-di-butyl-4-methylphenol and benzene sulfonyl quinolinium chloride would be expected to increase the Staeger oxidation life to a point about halfway between their separate effects. Thus, for this 50/50 mixture at 0.4 weight per cent concentration, the expected Staeger life would be about 285 hours. However, examination of Table I will show that a value of 610 hours was obtained, which is more than a twofold increase over what would be predicted. An even greater synergistic activity was found for benzene sulfonyl 8-hydroxyquinolinium chloride for which an oxidation life of about 270 hours would be predicted when added to the antioxidant containing oil, whereas the oil sample increased in neutralization number by only 0.05 unit after 570 hours, at which time the test had to be discontinued due to depletion. The synergistic action of benzene sulfonyl (2,6-)lutidinium chloride was masked by its own potent antioxidant effect since it was impossible to determine the exact Staeger life of this material alone, again due to depletion of the sample after the abnormally long duration of 768 hours.

EXAMPLE IX

A comparison of the effectiveness of compounds of the present invention and of aliphatic sulfonic acid derivatives are shown in the following preparations and tests:

*Product A.*—14 g. of paraffin wax sulfonyl chloride (prepared by reacting a $C_{24}$–$C_{26}$ wax, having a melting point of about 50° C. and an average molecular weight of about 330–340, with $SO_2$ and $Cl_2$ in the presence of light), containing about 10% by weight of hydrolyzable chlorine, and 5 g. of 2,6-lutidine were mixed together and heated with stirring several hours at about 100° C. to obtain the reaction product comprising paraffin wax sulfonyl lutidinium chloride. Substantially equal molar proportions of the chloride and lutidine were used in the reaction.

*Product B.*—9.8 g. of product A and 5.2 g. of the sodium salt of "Lorol B" alcohols (mixed $C_{10}$–$C_{18}$ alcohols obtained from hydrogenated coconut oil and having an average chain length of 12.6 carbon atoms) were mixed together and heated with stirring several hours at about 100° C. The resulting product was paraffin wax sulfonyl lutidinium alkyl oxide. Substantially equal molar proportions of sodium alcoholate and product B were used in the reaction.

*Product C.*—8 g. of benzene sulfonyl chloride and 5 g. of 2,6-lutidine were mixed together and heated with stirring for several hours at about 100° C. to obtain benzene sulfonyl lutidinum chloride. Substantially equal molar proportions of chloride and lutidine were used in the reaction.

*Product D.*—6.7 g. of product C and 5.2 g. of the sodium salt of "Lorol B" alcohols were mixed together and heated with stirring several hours at about 100° C. The resulting product was benzene sulfonyl lutidinium alkyl oxide. Substantially equal molar proportions of product C and sodium alcoholates were used in the reaction.

Blends were prepared in which a solvent extracted Mid-Continent lubricating oil having an S. U. S. viscosity at 210° F. of about 40 containing 0.06% by weight of zinc naphthenates was used as a base stock. One blend contained 0.2% by weight of product A and another contained 0.2% by weight of product C. These blends and a portion of the base oil per se were tested for "Staeger" oxidation life by the procedure described in Example I. The results are as follows:

| Product in Oil Base Stock | Staeger Life, Hours |
|---|---|
| None | 190 |
| Product A, 0.2 wt. percent | 194 |
| Product C, 0.2 wt. percent | 475 |

The paraffin wax sulfonyl chloride derivative (product A) was substantially ineffective as an oxidation inhibitor, whereas the benzene sulfonyl chloride derivative gave an improvement of 285 hours over the base stock.

Blends were prepared containing 0.2% by weight of either product B or product D in a turbine mineral oil base stock having an S. U. S. viscosity at 210° F. of about 40, the base stock containing 0.06% by weight of zinc naphthenates. These blends and a sample of the base stock per se were also tested by the Staeger test mentioned above. The results are as follows:

| Product in Oil Base Stock | Staeger Life, Hours |
|---|---|
| None | 74 |
| Product B, 0.2 wt. percent | 90 |
| Product D, 0.2 wt. percent | 276 |

The alkyl oxide derivative of the wax sulfonyl compound gave an improvement of only 16 hours, whereas the same derivative of the benzene sulfonyl compound (product D) improved the base stock by 202 hours.

EXAMPLE X

*Product E.*—A petroleum sulfonic acid-oil solution (500 ml.) containing acid corresponding to 5.62 gm./100 ml. of sodium soap (420 molecular weight) was refluxed for 8 hours with 50 ml. of absolute ethanol. At the end of this time, 21 ml. of alcohol were taken overhead through a distillation column to remove the water formed during the esterification. A 10% excess (3.3 ml.) of mixed pyridine bases having a boiling range of 125/145° C., and consisting chiefly of methyl pyridines, was added along with another 100 ml. of absolute ethanol. After refluxing for several hours, the mixture separated into two layers. The upper layer, which was the alcohol solution of the reaction products, was evaporated under nitrogen and 37.0 gm. of dark brown viscous liquid was recovered. This liquid, soluble in heptane and in oil and consisting chiefly of petroleum sulfonyl methyl pyridinium ethyl oxide, was designated product E.

*Product F.*—Two liters of a petroleum sulfonic acid-oil containing sulfonic acid corresponding to a soap content of 10.6 gm./100 ml. (526 molecular weight) was blown with nitrogen at room temperature for three hours to remove dissolved $SO_2$ gas. The oil was extracted four times with 500 ml. portions of absolute ethanol. The extract was filtered and dried over anhydrous calcium sulfate. Approximately one liter of ethanol was removed from the mixture by distillation. The weight of the extract thus prepared was 829 gm. This material was refluxed with a 10% excess of 2,6-lutidine (65.5 gm.) for four hours and then evaporated on the steam bath under nitrogen. The additive recovered in this manner weighed 278 gm. and consisted chiefly of petroleum sulfonyl lutidinium ethyl oxide. It was designated as product F.

The sulfonic acids used in making these products were typical predominantly aromatic sulfonic acids obtained by conventionally treating a petroleum lubricating oil fraction with fuming sulfuric acid, settling the sludge, and extracting the oil with isopropanol-water solution.

Product E was evaluated as a rust inhibitor in the following manner. A 300 ml. sample of motor gasoline containing 0.02 weight per cent of product E was added to a pint bottle containing 30 ml. of water. A polished steel strip measuring ¾" x 7" x ¹⁄₁₆" was added and the bottle capped and shaken thoroughly. In a similar manner a control sample containing no additive was prepared. Periodically, the steel strips were examined visually for evidence of rust formation.

*Appearance of steel strip after indicated storage time*

| Storage Time, Days | Gasoline+0.02 Wt. Percent Product E | Gasoline Alone |
|---|---|---|
| 3 | No Rusting | Medium Rusting in Gasoline Layer. Heavy Rusting in Water Layer. |
| 5 | do | Heavy Rusting. |
| 30 | do | Do. |
| 90 | do | Do. |

The effectiveness of such additives for preventing rust is apparent.

An evaluation of products E and F as rust inhibitors for fluid type rust preventives was made by means of the JAN-H-792 humidity cabinet. This apparatus operates under conditions of 100% relative humidity and at a temperature of 120° F. Blends containing 2 weight per cent of the additives were made with an acid treated Coastal distillate having a viscosity of 30.7 SUS/210° F. and 105.6 SUS/100° F. Sand blasted steel panels further cleaned by washing with heptane and methyl alcohol solvents were slushed for one minute in the rust preventive mixtures described above. The treated panels were allowed to drain four hours and then were placed in the JAN-H-792 humidity cabinet. The panels were examined periodically for rusting, and the humidity cabinet lift determined. Humidity cabinet life is defined as the time required for a trace of rust to form. The trace rust condition is reached when the number of corrosion areas on both sides of the test panel is more than three or when any one of the corrosion areas has a maximum linear dimension of more than 1 mm. Under these test conditions the following results were obtained:

| Product in Oil | Concentration in Oil, Wt. Percent | JAN-H-792 Humidity Cabinet Life, Hours |
|---|---|---|
| None | 0 | Less than 4. |
| E | 2.0 | 48. |
| F | 2.0 | 156. |

Probably the greater molecular weight of product F is the reason for its better performance.

These materials are also effective additives for reducing sludge formation in gasoline engines as illustrated by the following example. Product E was evaluated as a sludge inhibitor as follows. A fresh, used oil sample from a FL-2 engine test on a high deposit forming fuel was filtered to remove the suspended sludge. A 50 gm. sample of this filtered oil was stored in a 250 ml. glass stoppered Erlenmeyer flask for two weeks at 190° F. At the end of this storage period the sludge that had formed was removed by filtering the oil through a sintered glass crucible, de-oiled by washing with heptane, and dried. The weight of sludge obtained under these conditions was 140 mg. By adding 0.02 weight per cent of product E to another 50 gm. sample of the same oil, the weight of the sludge formed during the same storage period was reduced to 86 mg. or by 42%. Thus, it may be seen that the rate of polymerization of reactive compounds present in the used oil was appreciably reduced by the addition of the experimental additive.

The products of the present invention may be employed not only in ordinary hydrocarbon lubricating oils but also in the "heavy duty" type of lubricating oils which have been compounded with such detergent-type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like. Other types of additives, such as phenols and phenol sulfides, may also be present.

The lubricating oil base stock used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed in admixtures with mineral oils.

For the best results the base stock chosen should normally be an oil which without the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and defoamers are the higher alcohols having preferably 8 to 20 carbon atoms, e. g., octyl alcohol, lauryl alcohol, stearyl alcohol, and the like.

In addition to being employed in lubricants, the additives of the present invention may also be used in other mineral oil products such as motor fuels, fuel oils, hydraulic fluids, torque converter fluids, cutting oils, flushing oils, turbine oils, transformer oils, industrial oils, process oils, and the like, and generally as antioxidants, rust inhibitors, and the like in mineral oil products. They may also be used in gear lubricants, greases and other products containing mineral oils as ingredients.

What is claimed is:

1. A petroleum hydrocarbon product containing in the range of about 0.001 to 10% by weight of a material having the following formula:

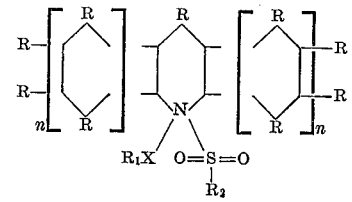

wherein the R radicals are selected from the class consisting of hydrogen and saturated hydrocarbon groups having in the range of 1 to 20 carbon atoms, $n$ is 0 to 1, X is selected from the class consisting of oxygen and sulfur, $R_1$ is selected from the class consisting of alkyl and aromatic hydrocarbon groups having in the range of 1 to 20 carbon atoms, and $R_2$ is selected from the class consisting of aryl and alkaryl groups having in the range of 6 to about 30 carbon atoms and a corrosion-inhibiting amount of zinc naphthenate.

2. A composition according to claim 1 wherein the petroleum hydrocarbon product is a lubricating oil.

3. A composition according to claim 1 in which each of said R radicals represents hydrogen.

4. A composition according to claim 1 wherein $R_1$ is an ethyl group.

5. A composition as in claim 1 wherein $R_1$ is obtained from a mixture of $C_{10}$–$C_{18}$ alcohols having an average of about 12.6 carbon atoms from hydrogenated coconut oil.

6. A composition as in claim 1 wherein $R_1$ is an octadecyl radical.

7. A composition as in claim 1 wherein $R_2$ is a benzene radical.

8. A petroleum hydrocarbon product containing in the range of about 0.05 to 5.0% by weight of benzene sulfonyl lutidinium alkyl oxide wherein the alkyl oxide group is obtained from a mixture of $C_{10}$–$C_{18}$ alcohols from hydrogenated coconut oil having an average of about 12.6 carbon atoms, and a corrosion-inhibiting amount of zinc naphthenate.

9. A petroleum hydrocarbon product containing in the range of about 0.05 to 5.0% by weight of benzene sulfonyl lutidinium octadecyl sulfide.

10. A petroleum hydrocarbon product containing in the range of about 0.05 to 5.0% by weight of aromatic sulfonyl methylpyridinium ethyl oxide, said aromatic sulfonyl group being obtained from petroleum sulfonic acids, and a corrosion-inhibiting amount of zinc naphthenate.

11. A petroleum hydrocarbon product containing in the range of about 0.05 to 5.0% by weight of aromatic sulfonyl lutidinium ethyl oxide, said aromatic sulfonyl group being obtained from petroleum sulfonic acids, and a corrosion-inhibiting amount of zinc naphthenate.

12. As a new composition of matter, benzene sulfonyl lutidinum octadecyl sulfide.

References Cited in the file of this patent

UNITED STATES PATENTS

| | | |
|---|---|---|
| 2,270,577 | Bergstrom | Jan. 20, 1942 |
| 2,412,634 | Schwartz | Dec. 17, 1946 |
| 2,467,118 | Duncan et al. | Apr. 12, 1949 |
| 2,582,733 | Zimmer et al. | Jan. 15, 1952 |
| 2,676,926 | Smith | Apr. 27, 1954 |
| 2,694,045 | Jones | Nov. 9, 1954 |

FOREIGN PATENTS

| | | |
|---|---|---|
| 940,088 | France | May 10, 1948 |

(Corresponding U. S. 2,537,428, Jan. 9, 1951)